US005765821A

United States Patent [19]

Janisse et al.

[11] Patent Number: 5,765,821

[45] Date of Patent: Jun. 16, 1998

[54] PORTABLE BICYCLE REPAIR STAND

[76] Inventors: Eric Janisse; John Janisse, both of P.O. Box 3625, Mammoth Lakes, Calif. 93546

[21] Appl. No.: 732,972

[22] Filed: Oct. 16, 1996

[51] Int. Cl.[6] .......... B23Q 3/00

[52] U.S. Cl. .......... 269/16; 269/48.1; 269/69; 269/71; 269/76; 269/909

[58] Field of Search .......... 269/45, 47–52, 269/71, 69, 76, 97, 98, 905, 909; 211/17–22

[56] References Cited

U.S. PATENT DOCUMENTS

| | | | |
|---|---|---|---|
| 619,186 | 2/1899 | Kingsbury . | |
| 2,226,078 | 12/1940 | Spahn | 269/48.1 |
| 2,310,255 | 2/1943 | O'Connell | 269/98 |
| 2,524,916 | 10/1950 | Loos | 269/97 |
| 2,736,286 | 2/1956 | Britton | 269/52 |
| 3,199,206 | 8/1965 | Snapp | 269/905 |
| 3,317,205 | 5/1967 | Kerr | 269/76 |
| 3,595,556 | 7/1971 | Schonauer | 269/905 |
| 3,837,632 | 9/1974 | Nelson | 269/48.1 |
| 3,981,491 | 9/1976 | Snyder | 269/64 |
| 4,116,341 | 9/1978 | Hebda . | |
| 4,145,006 | 3/1979 | Webb | 269/69 |
| 4,343,404 | 8/1982 | Folsom . | |
| 4,887,754 | 12/1989 | Boyer et al. . | |
| 5,141,211 | 8/1992 | Adams | 269/16 |
| 5,222,707 | 6/1993 | Myers . | |
| 5,385,280 | 1/1995 | Littlepage et al. | 269/71 |
| 5,487,537 | 1/1996 | Rye | 269/69 |
| 5,605,321 | 2/1997 | Jarvis | 269/100 |

*Primary Examiner*—Robert C. Watson
*Attorney, Agent, or Firm*—Kelly Bauersfeld; Lowry & Kelley, LLP

[57] ABSTRACT

A bicycle repair stand is disclosed which can be used in conjunction with a conventional sports rack attached to the roof of an automobile. The bicycle repair stand includes a generally vertical ground-engaging support post, a repair stand supporting arm which extends between the ground-engaging support post and the automobile, a generally horizontal bicycle carrying arm extending from the support post, and a bicycle seat tube or frame engaging clamp attached to the bicycle carrying arm. The tube or frame-engaging clamp may be rotated relative to the bicycle carrying arm to support the bicycle in any desired orientation.

19 Claims, 5 Drawing Sheets

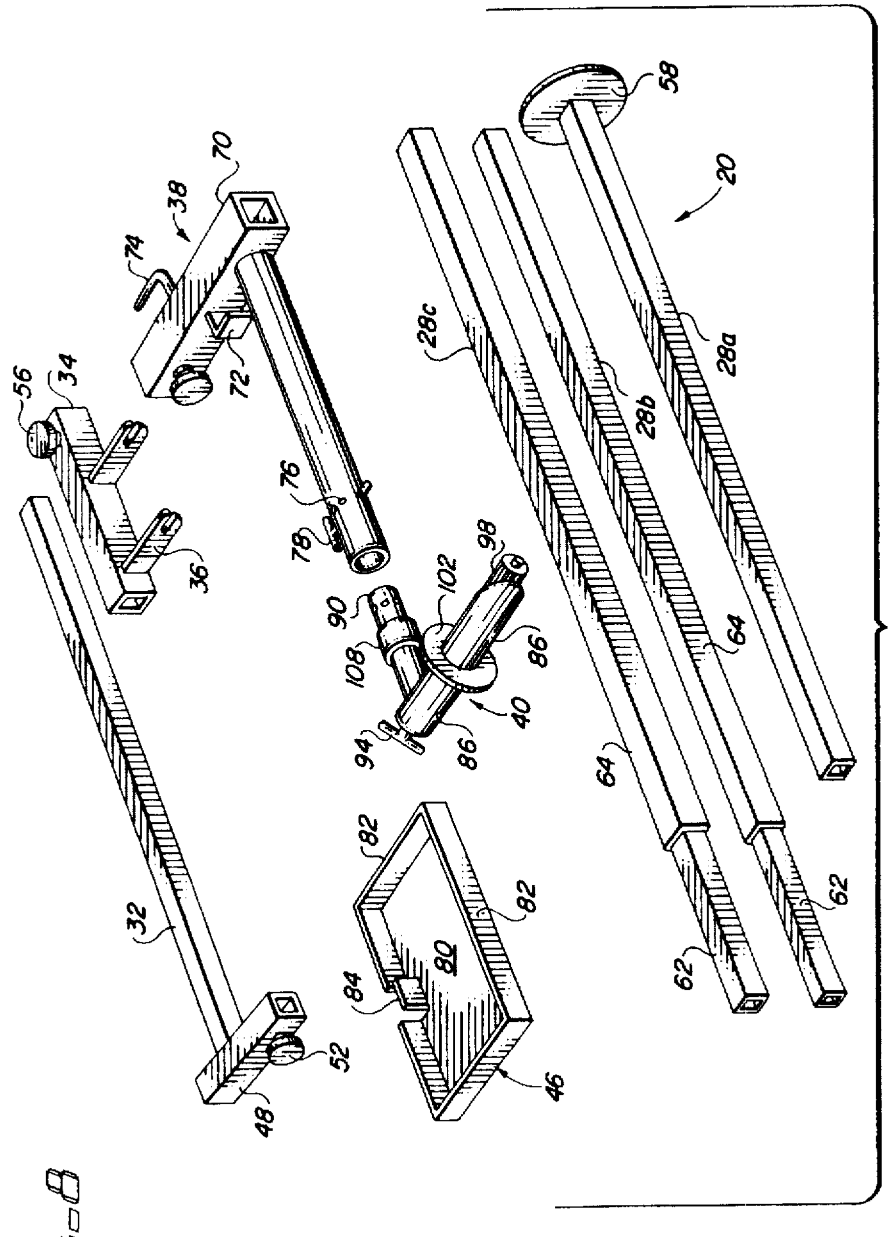
FIG-9
FIG-8
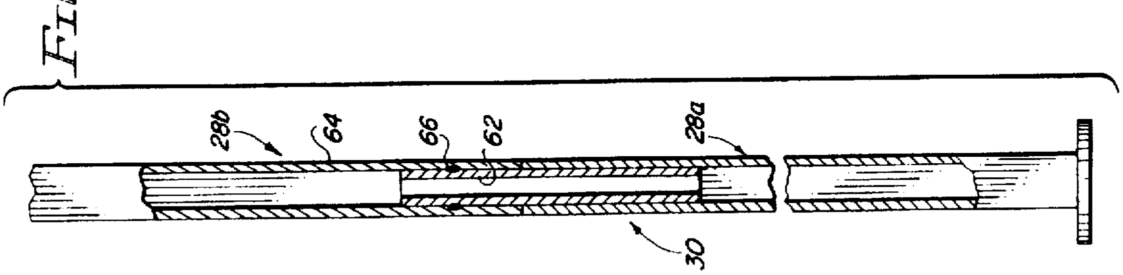

PORTABLE BICYCLE REPAIR STAND

BACKGROUND OF THE INVENTION

This invention relates to devices which suspend a bicycle off the ground in such a way as not to interfere with the moving parts thereof so that it may be serviced. More specifically, the present invention relates to a portable bicycle repair stand which may be supported, in part, by an automobile.

In general, work stands or bicycle repair stands are well known in the prior art. Conventional bicycle repair stands include a heavy duty metal frame which is supported on a base and has a vertically extending frame member terminating in a horizontally aligned supporting member designed to accommodate a clamping mechanism used to clamp the central horizontal frame of the bicycle externally. Various modifications and adjustments to this work stand have been developed. In its simplest form, the stand is of simple metal construction, comprising a pair of tubular metal members which are horizontally oriented and spaced apart at their respective lowermost sections to provide a base support and thereafter are angularly aligned toward each other to come together at their uppermost portion, thereafter extending horizontally and generally parallel to the lowermost sections. The upper horizontally extending portions terminate in the clamping mechanism designed to retain the bicycle. The height of the apparatus is sufficient to handle a conventional racing bicycle or mountain bicycle to be supported in any orientation so that portions of the bicycle may be repaired or adjusted, and to also permit gears to be modified or changed.

More elaborate variations on bicycle repair stands include separate components for the lower supporting base, the vertically aligned section and the upper horizontally aligned section. The base may be of one piece construction and formed in a rectangle, a diamond, crossed in an "X" pattern, or any other configuration to provide stability. The base may include several suction pads to assure a more secure grip or may include wheels for rolling the stand from one location to another location. The vertically aligned section mating with the base member may be of one piece construction or may include one or more telescoping portions so that the height of the vertical section may be adjusted to accommodate bicycles of different sizes or to bring a specific portion of the bicycle into easier reach of the worker. The portion supporting the clamping mechanism is usually horizontally oriented and located at the uppermost portion of the vertical section.

The upper horizontal section or angular section supports a clamp member which is usually spring-loaded and may be adjusted to any bicycle frame size. The clamp may be vinyl coated to protect the bicycle finish. The clamp may also contain a lever system which allows the bicycle to be positioned anywhere within a full 360 degree rotation.

Conventional bicycle stands are adequate for repairing and adjusting bicycles in the home workshop or in a factory environment, since they are typically heavy and bulky and are not easily portable from one location to another. However, bicycles are routinely transported via motor vehicles to various locations for use. It is frequently found on arrival at the new location that further changes to the bicycle are required to achieve optimum performance at the new location. This is a common situation particularly for competitive bicycle events such as road racing or mountain bike events. Furthermore, even if a bicycle was ideally set up in a shop, after many miles of motor vehicle transport it may be found necessary to readjust various components of the bicycle in order to achieve optimal performance after arrival at the event location. Portable bicycle stands are desirable for such situations.

Accordingly, there has been a need for a novel portable bicycle repair stand which can operate in the manner of the conventional bicycle repair stand and be easily transported in a vehicle to the site where the bicycle ride begins. Such a bicycle repair stand should preferably be capable of assembly and disassembly without the use of tools, and be of a simple design which facilitates manufacturing economies. Further, such a portable bicycle repair stand is needed which may utilize the automobile for stability without requiring any permanent attachment thereto. The present invention fulfills these needs and provides other related advantages.

SUMMARY OF THE INVENTION

The present invention resides in an improved bicycle repair stand that may be assembled and disassembled without the use of tools. The bicycle repair stand comprises a generally vertical, ground-engaging support post, a repair stand supporting arm having a first end attached to the support post and a second end attached to a stationary structure, a generally horizontal bicycle carrying arm having a first end fixed to the support post, and means supported by the bicycle carrying arm, for attaching a bicycle to the bicycle repair stand.

In one preferred form of the invention, the generally vertical, ground-engaging support post includes a plurality of detachable post sections. The repair stand supporting arm is generally horizontal and includes a first sleeve at a first end thereof, for slidably capturing an upper portion of the ground-engaging support post, and a second sleeve at a second end thereof. The second sleeve slidably captures the second end of the repair stand supporting arm and is itself attached to a stationary structure, such as an automobile. The second sleeve includes a bicycle front fork-imitating bracket for attachment to a front fork receiving clamp assembly associated with the stationary structure.

The bicycle carrying arm extends generally horizontally from the support post in an opposite direction relative to the repair stand supporting arm. The bicycle carrying arm includes a third sleeve at a first end thereof for slidably capturing a portion of the ground-engaging support post.

Each sleeve includes means for locking the respective sleeve in place relative to its respective ground-engaging support post or repair stand supporting arm. Further, a pan or tool tray is supported atop the bicycle carrying arm.

The attaching means comprises means for attaching a bicycle seat tube to the bicycle repair stand. In particular, the attaching means comprises a bicycle seat tube engaging clamp which is insertable into the bicycle seat tube, and a clamp support stud which extends generally perpendicular to the clamp for connection to the bicycle carrying arm.

Means are provided for connecting the clamp support stud to the bicycle carrying arm in a manner which permits the clamp to be fixed in a selected angular orientation relative to a longitudinal axis of the bicycle carrying arm. In this regard, a portion of the clamp support stud coaxially overlaps a portion of the bicycle carrying arm and is capable of rotation relative to the bicycle carrying arm along a common longitudinal axis. The connecting means comprises a plurality of alignable apertures through the both the clamp support stud and the bicycle carrying arm, which receive a locking pin therethrough.

In a second preferred form of the invention, the number of component parts of the bicycle repair stand are reduced relative to the first preferred form, and a frame-engaging clamp is utilized rather than a clamp which is insertable into to the bicycle seat tube. A plurality of over-center clamps are utilized to secure tubular sections of the repair stand to one another in an adjustable manner.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 8 is an enlarged sectional view of the ground-engaging support post taken generally along the line 8—8 of FIG. 1;

FIG. 9 is a perspective view of the bicycle repair stand of FIG. 1, wherein all of the components have been disassembled from one another;

DETAILED DESCRIPTION OF THE PREFERRED EMBODIMENTS

Figure 2:
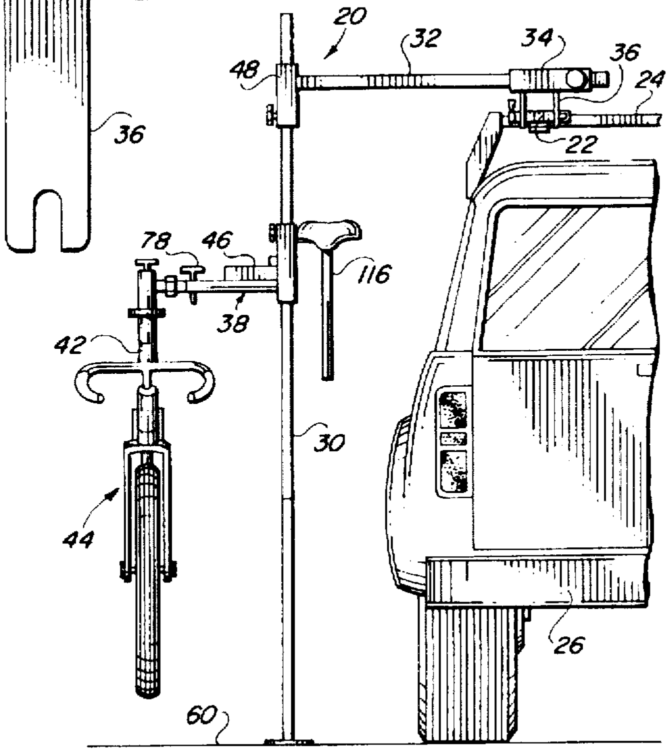
FIG. 2 is a front elevational view of the bicycle repair stand illustrated in FIG. 1, shown with a generally horizontal repair stand supporting arm extending between a generally vertical ground-engaging support post and a front fork receiving clamp assembly of a transport rack mounted to an automobile, and further illustrating the manner in which a bicycle seat tube engaging clamp is utilized to connect the bicycle repair stand to a bicycle.
Figure 4:
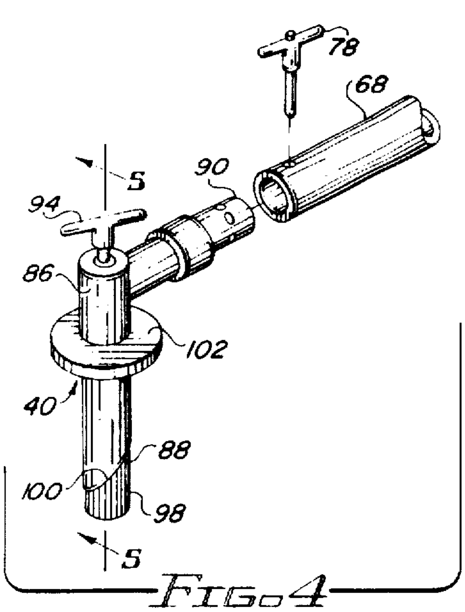
FIG. 4 is an enlarged, fragmented exploded view of the portion of the bicycle repair stand indicated by the number 4 in FIG. 1, illustrating attachment of the bicycle seat tube engaging clamp to a generally horizontal bicycle carrying arm.
Figure 5:
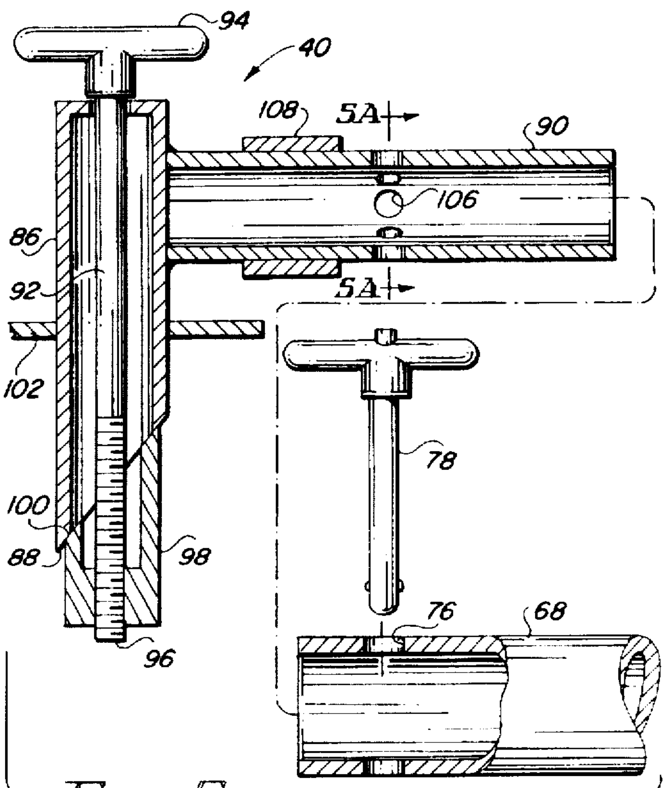
FIG. 5 is an enlarged sectional view taken generally along the line 5—5 of FIG. 4.
Figure 6:
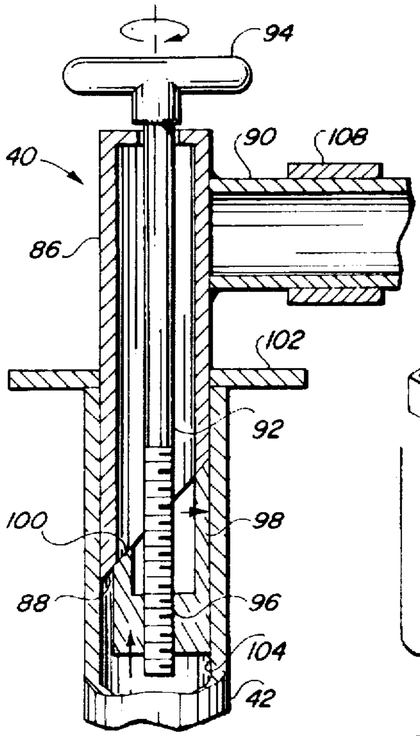
FIG. 6 is a fragmented sectional view similar to that illustrated in FIG. 5, illustrating the manner in which the bicycle seat tube engaging clamp is inserted into a bicycle seat tube to secure the bicycle to the bicycle repair stand.
Figure 7:
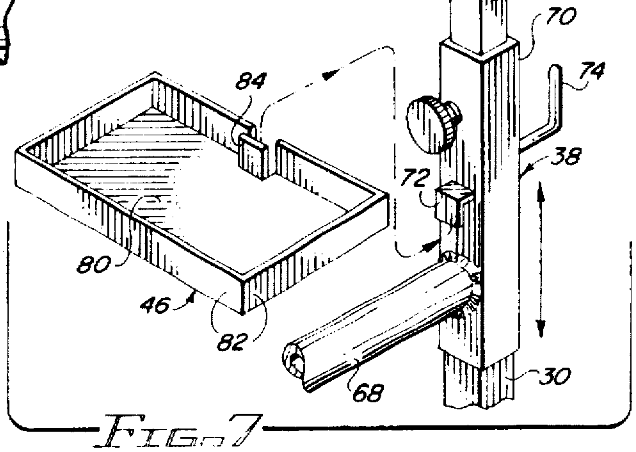
FIG. 7 is an enlarged, fragmented and partially exploded view of the area indicated by the number 7 in FIG. 1.
Figure 5A:
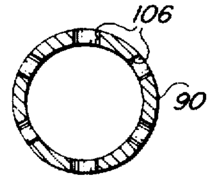
FIG. 5A is an enlarged sectional view taken generally along the line 5A—5A of FIG. 5.

As shown in the drawings for purposes of illustration, the present invention is concerned with a portable bicycle repair stand, generally designated in the accompanying drawings by the reference numbers 20 and 20'. When assembled, as illustrated in FIG. 2, the bicycle repair stand 20 may be attached to a front fork receiving clamp assembly 22 of a type typically utilized to transport bicycles atop a transport rack 24 fixed to the roof of an automobile 26. The front fork receiving clamp assembly 22 is similar to the so-called "fork mounts" manufactured by Thule (Sweden) Car Rack Systems, whose U.S. address is 42 Silvermine Road, Seymour, Conn. 06483.

In accordance with the present invention, the accompanying drawings illustrate two preferred embodiments. FIGS. 1–10 illustrate a first bicycle repair stand generally designated by the reference number 20, and FIGS. 11–18A–C illustrate a second bicycle repair stand 20'. These bicycle repair stands 20 and 20' will be described separately below, and in the description of the second repair stand 20', like components will retain the same reference numbers as those identified in connection with the repair stand 20, being differentiated only by use of the prime "'" symbol.

Figure 1:
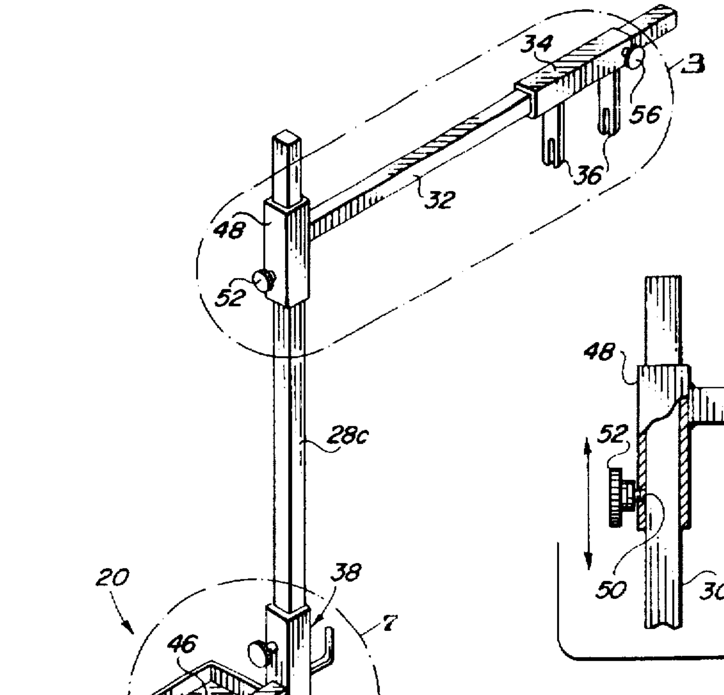
FIG. 1 is a top, front and side perspective view of a portable bicycle repair stand embodying the present invention.
Figure 3:
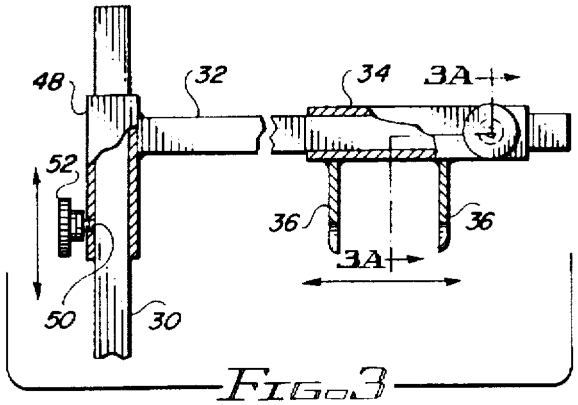
FIG. 3 is a partially fragmented, partially sectional elevational view taken generally of the area indicated by the number 3 in FIG. 1, illustrating a first sleeve at a first end of the repair stand supporting arm which slidably captures an upper portion of the ground-engaging support post, and a second sleeve which slidably captures the second end of the repair stand support arm which itself includes a bicycle front fork-imitating bracket for attachment to the front fork receiving clamp assembly.
Figure 3A:
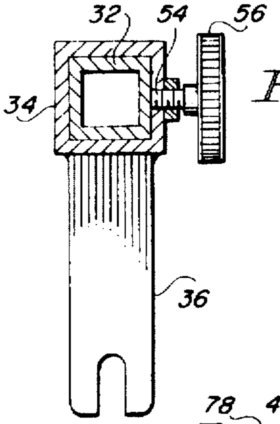
FIG. 3A is an enlarged sectional view taken generally along the line 3A—3A of FIG. 3.

With reference initially to FIGS. 1 and 9, the bicycle repair stand 20 is comprised of several components that may be assembled and disassembled easily without the use of tools. The components include three vertical support post sections **28*a–c* which, when assembled, form a generally vertical, ground-engaging support post 30, a repair stand supporting arm 32 which has a first end attachable to the support post 30 and a second end which may be attached to a stationary structure, such as the automobile 26, and a sleeve 34 which slidably captures the second end of the repair stand supporting arm 32. The sleeve 34 includes a bicycle front fork-imitating bracket 36 which is attachable directly to the front fork receiving clamp assembly 22. Further, the bicycle repair stand 20 includes a bicycle carrying arm 38 which has a first end positionable upon the ground-engaging support post 30, and a bicycle seat tube engaging clamp 40** which is rotatably attached to a second end of the bicycle carrying arm 38 and which is insertable into a bicycle seat tube 42 to secure the bicycle 44 to the repair stand 20. Additionally, a pan or tool tray 46 is provided which may be conveniently positioned over the bicycle carrying arm 38.

With reference to FIGS. 1–3A, the repair stand supporting arm 32 includes a sleeve 48 at a first end thereof, for slidably capturing an upper portion of the ground-engaging support post 30. The sleeve 48 comprises a rectangular tube welded to the first end of the repair stand supporting arm 32, and is configured to envelope a portion of the uppermost post section 28C. A lock bolt 50 extends through a side of the sleeve 48 which has a knob 52 attached thereto. The knob 52 may be turned to fix the sleeve 48, and thus the repair stand supporting arm 32 in a selected position along the length of the ground-engaging support post 30.

The sleeve 34 is similar to the sleeve 48 in that it comprises a rectangular tube with a lock bolt 54 extending therethrough designed to engage a wall of the repair stand supporting arm 32 to lock the sleeve 34 in a desired location along the length of the supporting arm 32. A knob 56 is fixed to the lock bolt 54 to facilitate turning the bolt 54 through a threaded aperture for purposes of frictionally engaging a wall of the supporting arm 32. The sleeve 34 includes two flanges which extend therefrom to form the front fork-imitating bracket 36, which is attachable to the front fork receiving clamp assembly 22.

With reference to FIGS. 1, 2, 8 and 9, the vertical, ground-engaging support post 30 includes a lowermost post section 28*a*, an intermediate post section 28B, and an uppermost post section 28*b*. The lowermost post section 28*a* includes a ground-engaging foot 58 which, when in use, directly rests upon a ground surface 60. The other two post sections 28*b* and 28*c* are of the same construction, and include an inner rectangular tube 62 welded at weld 66 within and extending longitudinally outwardly from an outer rectangular tube 64. The outermost dimensions of the inner rectangular tubes 62 are such that they are capable of being fitted within an upwardly presented end of the next lower post section 28A–C. Thus, the inner rectangular tube portion 62 of the intermediate post section 28B is slidably fitted within an upper end of the lowermost post section 28A, and the inner rectangular tube portion 62 of the uppermost post section 28C is received within an upper end of the intermediate post section 28B to form the vertical, ground-engaging support post 30.

Referring now to FIGS. 1, 2, 7 and 9, the bicycle carrying arm 38 includes a cylindrical tube 68 having a sleeve 70 at one end thereof configured to slidably capture a portion of the ground-engaging support post 30. The sleeve 70 is identical to the sleeve 48 forming a portion of the repair stand supporting arm 32, with the exception that it is provided a tool tray retaining bracket 72 adjacent the lock bolt 50 and knob 52, and a bicycle seat hook 74 on an opposite side thereof. A plurality of apertures 76 are provided about the periphery of the cylindrical tube 68 adjacent to an end thereof opposite the sleeve 70. These apertures 76 are dimensioned to receive therethrough a locking pin 78 which is utilized to secure the bicycle seat tube engaging clamp 40 to the bicycle carrying arm 38.

The pan or tool tray 46 includes a base 80 having upwardly extending side walls 82 about the periphery of the base 80. Centrally along a rear side of the tool tray 46 there is provided a tool tray retaining bracket-engaging tab 84 which interfits with the retaining bracket 72 to securely hold the tool tray 46 in place over the cylindrical tube 68 of the bicycle carrying arm 38. The base 80 rests upon the cylindrical tube 68.

With reference now to FIGS. 1, 2, 4–6 and 9, the bicycle seat tube engaging clamp 40 includes an upper cylindrical tubular portion 86 having a lower inclined surface 88 which is welded to a cylindrical tubular clamp support stud 90, a clamp bolt 92 which extends from a handle 94 through the upper portion 86 to a lower threaded section 96 that is threaded through a movable block 98 having an upper inclined surface 100. Further, an abutment flange 102 extends outwardly from an outer periphery of the upper portion 86 to provide a stop against which an upper end of the bicycle seat tube 42 rests. The clamp 40 is structured so that after the movable block 98 and a lower end of the upper portion 86 are inserted into the bicycle seat tube 42 (FIG. 6), the handle 94 may be turned to cause the movable block 98 to travel upwardly along the lower threaded section 96 of the clamp bolt 92. As the upper inclined surface 100 engages the lower inclined surface 88, a portion of the movable block is caused to move outwardly against an interior surface 104 of the bicycle seat tube 42, thereby creating a friction lock between the clamp 40 and the bicycle seat tube 42. This effectively secures the bicycle 44 to the bicycle repair stand 20.

The clamp support stud 90 is dimensioned to fit within an open end of the cylindrical tube 68 of the bicycle carrying arm 38. Like the cylindrical tube 68, the clamp support stud 90 includes a plurality of apertures 106 about the circumference adjacent to the inserted end. These apertures 106 are located so as to align with the apertures 76 of the cylindrical tube 68. An abutment collar 108 is provided about the clamp support stud 90 so as to assist in such alignment of the apertures 106 with the apertures 76. By providing a tubular clamp support stud 90 within a tubular member 68, the tube engaging clamp 40 may be fixed in a selected angular orientation perpendicular to a longitudinal axis of the bicycle carrying arm 38. The apertures 76 and 106 may be aligned so that when the locking pin 78 is inserted therethrough, not only is the clamp support stud 90 securely fixed to the cylindrical tube 68, but also the angular orientation of the tube engaging clamp 40 is set and maintained. This facilitates positioning the bicycle 44 held by the bicycle repair stand 20 in a desired position for repair and maintenance.

Figure 10:
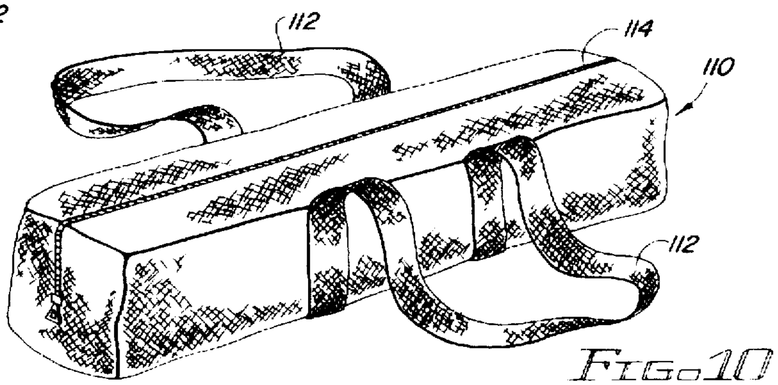
FIG. 10 is a perspective view of an exemplary bag in which all of the bicycle repair stand components illustrated in FIG. 9 can be stored for easy transport.

Finally, with regard to FIG. 10, all of the components of the bicycle repair stand 20 can be assembled as shown in FIG. 1 or disassembled into the basic components as illustrated in FIG. 9. When disassembled, they may be placed within any suitable bag 110 which is preferably provided flexible handles 112 and a zipper closure 114.

From the foregoing it should be apparent that the bicycle repair stand, when broken down into its component parts and placed within the bag 110, may be conveniently utilized to accompany one or more bicycles when being transported in or on an automobile. When a destination is reached, the repair stand 20 may be assembled as illustrated in FIGS. 1 and 2 so that the support post 30 provides a vertical, ground-engaging and load bearing support for the repair stand 20, and the repair stand supporting arm 32, which extends between the support post 30 and the automobile 26, provides lateral stability support. When the seat and seat post 116 of the bicycle 44 are removed from the bicycle seat tube 42, the bicycle is simply lifted up to insert the bicycle seat tube engaging clamp 40 into the bicycle seat tube 42. The handle 94 of the clamp 40 is turned to form a frictional engagement between the interior surface 104 of the bicycle seat tube 42 and the movable block 98 to secure the bicycle 44 to the bicycle repair stand 20. The clamp support stud 90 may be rotated within the cylindrical tube 68 and locked into a desired position by inserting the locking pin 78 through aligned apertures 76 and 106. The use of adjustable sleeves 34, 48 and 70 permits the bicycle repair stand 20 to be adjusted for use in varying types of terrain, on bicycles of different sizes and with different types and styles of automobiles.

Figure 11:
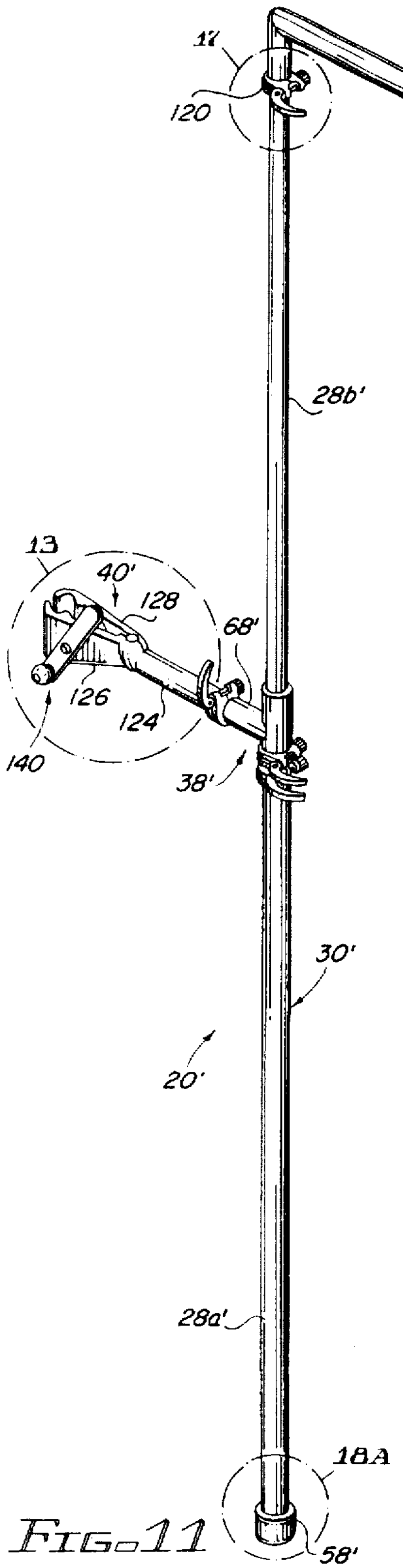
FIG. 11 is a top, front and side perspective view of a second preferred embodiment of a portable bicycle repair stand embodying the present invention.
Figure 12:
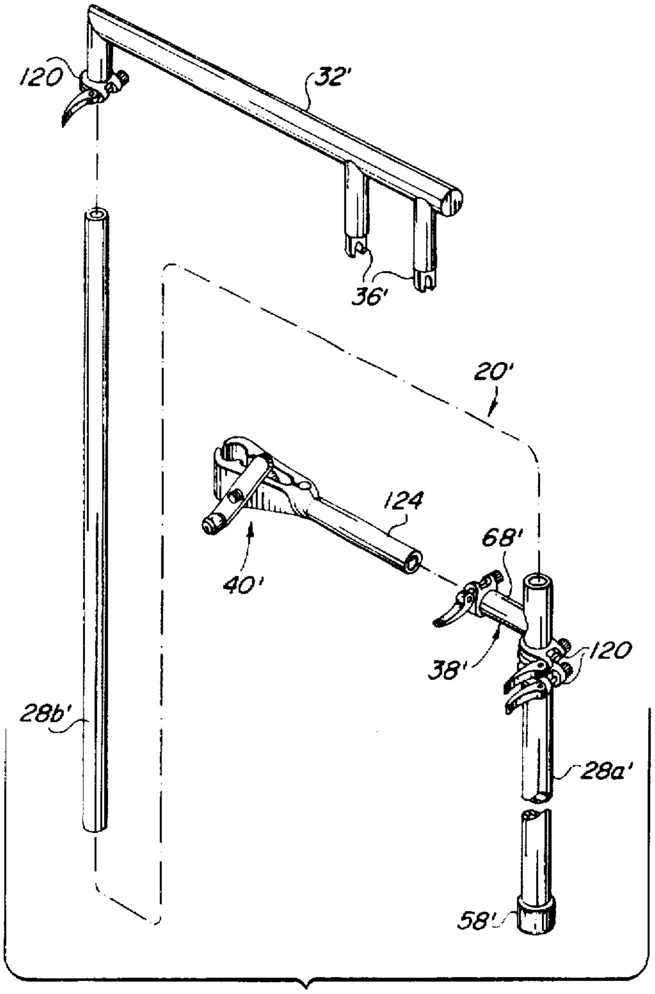
FIG. 12 is a perspective view of the bicycle repair stand of FIG. 11, wherein the component parts have been disassembled from one another.

With reference now to FIGS. 11 and 12, the bicycle repair stand 20' is also comprised of several components that may be assembled and disassembled easily without the use of tools. The components include two vertical support post sections 28a' and 28b' which, when assembled, form a generally vertical, ground-engaging support post 30', and a repair stand supporting arm 32' which has a first end attachable to the support post 30' and a second end which may be attached to a stationary structure, such as the automobile 26. The first end of the supporting arm 32' includes a bicycle front fork-imitating bracket 36' which is attachable directly to the front fork receiving clamp assembly 22. Further, the bicycle repair stand 20' includes a bicycle carrying arm 38' which has a first end attached to the ground-engaging support post 30', and a bicycle frame engaging clamp 40' which is rotatably attached to a second end of the bicycle carrying arm 38'.

Figure 17:
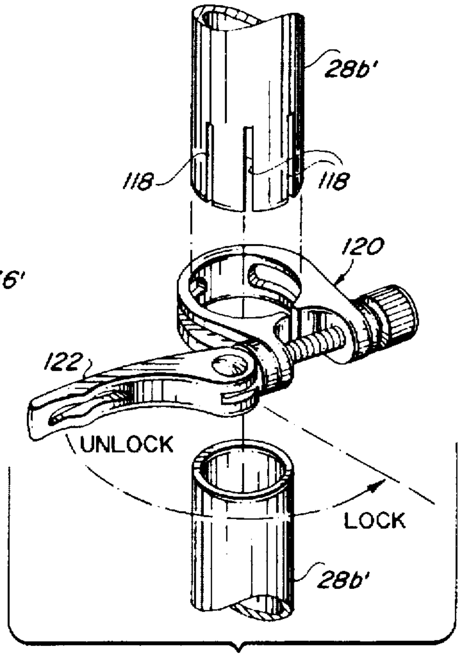
FIG. 17 is an enlarged, fragmented exploded view of the attachment between the repair stand supporting arm and an upper post section, taken of the area indicated by the number 17 in FIG. 11.

With reference to FIGS. 11, 12 and 17, the first end of the repair stand supporting arm 32' is L-shaped so as to receive an upper end of the upper post section 28a'. A plurality of slots 118 are provided in the downwardly facing end of the supporting arm 32' so as to permit the upper end of the post section 28b' to be inserted therein and then locked in place utilizing the clamp 120. As the handle 122 of the clamp 120 is pivoted from its unlock position (shown in FIG. 17) to its lock position (shown in FIG. 1), the clamp 120 will squeeze the adjacent portion of the supporting arm 32' together, and the slots 118 permit sufficient movement to ensure a frictional connection between the first end of the supporting arm 32' and the inserted portion of the upper post section 28b'.

Figure 18A:
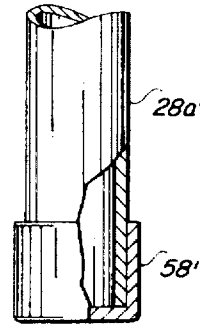
FIG. 18A is an enlarged, fragmented and partially sectional view of the area indicated by the number 18A in FIG. 11.
Figure 18B:
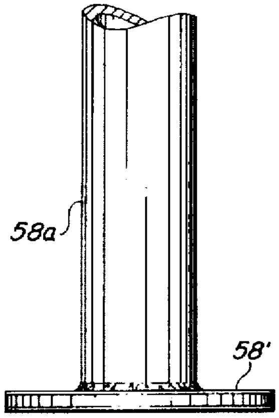
FIG. 18B is similar to FIG. 18A, illustrating an alternative embodiment.
Figure 18C:
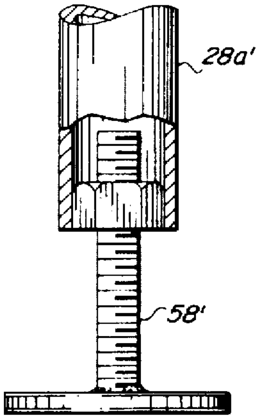
FIG. 18C is similar to FIGS. 18A and 18B, illustrating yet another alternative embodiment for a ground-engaging portion of the bicycle repair stand.

The vertical, ground-engaging support post 30' includes a lower post section 28a', and an upper post section 28b'. The upper post section 28b' is of a reduced diameter relative to the lower post section 28a' and the first end of the supporting arm 32' such that it is capable of being fitted within ends thereof and clamped into place utilizing the clamps 120. The lower post section 28a' includes a ground-engaging foot 58' which, when in use, directly rests upon a ground surface 60. FIGS. 18A–18C illustrate various types of ground-engaging feet 58' that may be employed with the present invention.

The bicycle carrying arm 38' includes a cylindrical tube 68' welded at a first end to an upper portion of the lower post section 28a'. The bicycle frame engaging clamp 40' includes a supporting tube 124 configured for insertion into an open end of the cylindrical tube 68', a first frame-engaging jaw member 126 fixed to an end of the supporting tube 124, and a second frame-engaging jaw member 128 which is pivotally attached to the supporting tube 124 in a manner which allows it to open and close relative to the first jaw member 126. In this regard, a pin 130 is utilized to secure the second jaw member 126 to the supporting tube 124. The supporting tube 124 is secured within the cylindrical tube 68' by means of another clamp 120.

Figure 14:
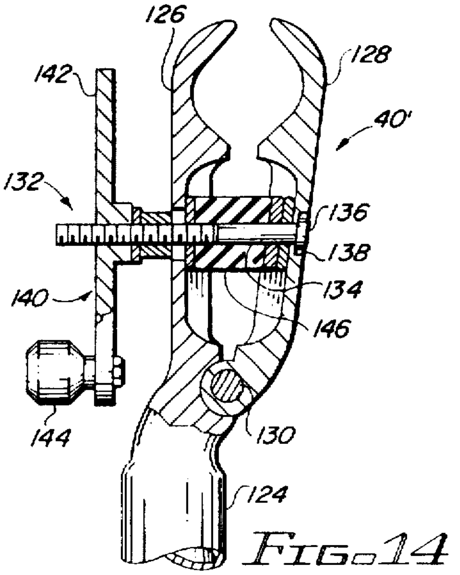
FIG. 14 is an enlarged, fragmented and partially sectional view taken generally along the line 14—14 of FIG. 13.
Figure 16:
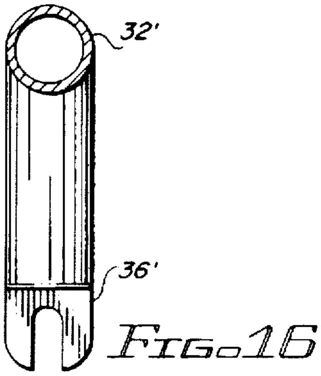
FIG. 16 is an enlarged sectional view taken generally along the line 16—16 of FIG. 11.
Figure 13:
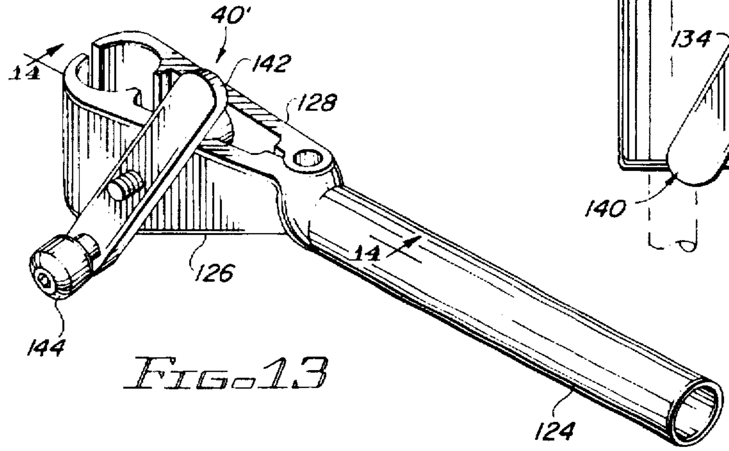
FIG. 13 is an enlarged view of a bicycle frame-engaging clamp indicated by the number 13 in FIG. 11.
Figure 15:
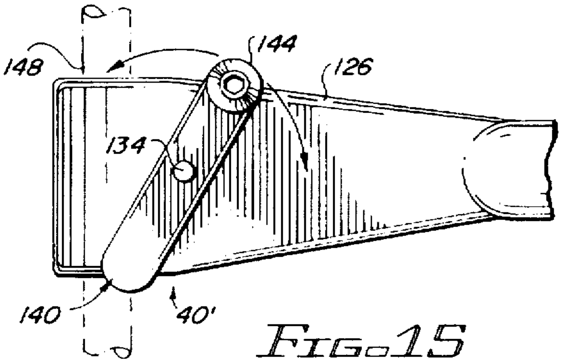
FIG. 15 is an elevational view of the bicycle frame-engaging clamp of FIGS. 13 and 14.

The second jaw member 128 is adjustably positionable relative to the first jaw member 126 by means of a control mechanism 132 illustrated in detail in FIGS. 13–15. The control mechanism includes a threaded bolt 134 having a headed end 136 positioned within a recess 138 on an exterior surface of the second jaw member 128, which extends through both jaw members 126 and 128 where a threaded end thereof is captured adjacent to the first jaw member 126 by a handle assembly 140. The handle assembly 140 includes a handle 142 having a central threaded aperture which is threaded over the exposed threaded end of the bolt 134. A knob 144 is provided on the handle to facilitate rotation of the handle 142 over the threaded end of the bolt 134. Surrounding the bolt 134 between the two jaw members 126 and 128 is a resiliently deformable elastomeric member 146 that serves to urge the second jaw member 128 away from the first jaw member 126. By tightening the handle assembly 140 onto the bolt 134, the separating force exerted on the jaw members 126 and 128 by the elastomeric member 146 may be overcome to move the second jaw member 128 toward the first jaw member 126. In this manner a frame member 148 may be secured between the jaw members 126 and 128 as desired.

Again all of the components of the bicycle repair stand 20' can be assembled as shown in FIG. 11 or disassembled into the basic components as illustrated in FIG. 12. When disassembled, they may be placed within any suitable bag 110 which is preferably provided flexible handles 112 and a zipper closure 114.

It will be understood that the bicycle repair stand 20' described above has many of the same advantages as discussed above in connection with the bicycle repair stand 20. The attachment of the bicycle frame engaging clamp 40' to the cylindrical tube 68' fixed to the ground engaging support post 30' is fully adjustable, thereby permitting the frame-engaging clamp 40' to be positioned as needed. Further, the height of the bicycle repair stand 20' may be easily adjusted by sliding the upper post section 28b' within the lower post section 28a', thus allowing the repair stand 20' to be utilized in connection with different types of vehicles and in various types of terrain.

Although two particular embodiments of the invention have been described in detail for purposes of illustration, various modifications may be made without departing from the spirit and scope of the invention. Accordingly, the invention is not to be limited, except as by the appended claims.

We claim:

1. A bicycle repair stand, comprising:

a generally vertical, ground-engaging support post;

a repair stand supporting arm having a first end attached to the support post and a second end attached to a stationary structure;

a sleeve for slidably capturing the second end portion of the repair stand supporting arm, the sleeve including means for locking the sleeve in place relative to the second end portion of the repair stand supporting arm, and a bicycle front fork-imitating bracket for attachment to a front fork receiving clamp assembly of the stationary structure;

a generally horizontal bicycle carrying arm having a first end fixed to the support post; and means supported by the bicycle carrying arm, for attaching a bicycle seat tube to the bicycle repair stand, the attaching means comprising a bicycle seat tube engaging clamp insertable into the bicycle seat tube.

2. The bicycle repair stand of claim 1, wherein the seat tube engaging clamp includes an abutment flange which limits insertion of the clamp into the bicycle seat tube.

3. The bicycle repair stand of claim 1, wherein the attaching means further comprises a clamp support stud which extends generally perpendicular to the clamp for connection to the bicycle carrying arm.

4. The bicycle repair stand of claim 3, including means for connecting the clamp support stud to the bicycle carrying arm in a manner permitting the tube engaging clamp to be fixed in a selected angular orientation perpendicular to a longitudinal axis of the bicycle carrying arm.

5. The bicycle repair stand of claim 4, wherein a portion of the clamp support stud coaxially overlaps a portion of the bicycle carrying arm and is capable of rotation relative to the bicycle carrying arm along a common longitudinal axis, and wherein the connecting means comprises a plurality of alignable apertures through both the clamp support stud and the bicycle carrying arm which receive a locking pin therethrough.

6. The bicycle repair stand of claim 1, including a pan supported atop the bicycle carrying arm.

7. The bicycle repair stand of claim 1, wherein the ground engaging support post comprises a plurality of detachable ground support post sections.

8. The bicycle repair stand of claim 1, wherein the first end of the repair stand supporting arm includes a sleeve for slidably capturing an upper portion of the ground-engaging support post.

9. The bicycle repair stand of claim 8, wherein the first end of the bicycle carrying arm includes a sleeve for slidably capturing a portion of the ground-engaging support post.

10. The bicycle repair stand of claim 9, wherein each sleeve includes means for locking the sleeve in place relative to the ground-engaging support post.

11. A bicycle repair stand that may be assembled and disassembled without the use of tools, comprising:

- a generally vertical, ground-engaging support post comprised of a plurality of post sections;
- a generally horizontal repair stand supporting arm having a first end thereof attachable to an upper portion of the ground-engaging support post, and a second end thereof attachable to a stationary structure, wherein the second end of the supporting arm includes a bicycle front fork-imitating bracket for attachment to a front fork receiving clamp assembly associated with the stationary structure;
- a bicycle carrying arm extending generally horizontally from the support post in an opposite direction relative to the repair stand supporting arm; and
- a clamp device attached to the bicycle carrying arm, for attaching a bicycle to the bicycle repair stand.

12. The bicycle repair stand of claim 11, wherein the horizontal repair stand supporting arm includes a first sleeve at the first end thereof for slidably capturing the upper portion of the ground-engaging support post, and a second sleeve at the second end thereof, the second sleeve slidably capturing the second end of the repair stand supporting arm, wherein each sleeve includes means for locking the sleeve in place relative to either the ground-engaging support post or the repair stand supporting arm.

13. The bicycle repair stand of claim 11, wherein the clamp device includes a bicycle-engaging clamp and a clamp support stud which extends from the clamp for connection to the bicycle carrying arm.

14. The bicycle repair stand of claim 13, including means for connecting the clamp support stud to the bicycle carrying arm in a manner permitting the clamp to be fixed in a selected angular orientation relative to a longitudinal axis of the bicycle carrying arm, wherein a portion of the clamp support stud coaxially overlaps a portion of the bicycle carrying arm and is capable of rotation relative to the bicycle carrying arm along a common longitudinal axis.

15. The bicycle repair stand of claim 13, wherein the bicycle-engaging clamp comprises a bicycle seat tube engaging clamp insertable into a bicycle seat tube.

16. The bicycle repair stand of claim 15, wherein the seat tube engaging clamp includes an abutment flange which limits insertion of the clamp into the bicycle seat tube.

17. The bicycle repair stand of claim 13, wherein the bicycle-engaging clamp comprises a bicycle frame-engaging clamp capable of exteriorly engaging a frame member of a bicycle.

18. A bicycle repair stand that may be assembled and disassembled without the use of tools, comprising:

- a generally vertical, ground-engaging support post comprised of a plurality of detachable post sections;
- a generally horizontal repair stand supporting arm having a first sleeve at a first end thereof, for slidably capturing an upper portion of the ground-engaging support post, and a second sleeve at a second end thereof, the second sleeve slidably capturing the second end of the repair stand supporting arm and itself being attached to a stationary structure, wherein the second sleeve includes a bicycle front fork-imitating bracket for attachment to a front fork receiving clamp assembly associated with the stationary structure;
- a bicycle carrying arm extending generally horizontally from the support post in an opposite direction relative to the repair stand supporting arm, the bicycle carrying arm including a third sleeve at a first end thereof for slidably capturing a portion of the ground-engaging support post;
- means for locking each sleeve in place relative to its respective ground-engaging support post or repair stand supporting arm;
- a pan supported atop the bicycle carrying arm; and
- means attached to a second end of the bicycle carrying arm, for attaching a bicycle seat tube to the bicycle repair stand, the attaching means comprising a bicycle seat tube engaging clamp insertable into the bicycle seat tube, and a clamp support stud which extends generally perpendicular to the clamp for connection to the bicycle carrying arm.

19. The bicycle repair stand of claim 18, including means for connecting the clamp support stud to the bicycle carrying arm in a manner permitting the clamp to be fixed in a selected angular orientation relative to a longitudinal axis of the bicycle carrying arm, wherein a portion of the clamp support stud coaxially overlaps a portion of the bicycle carrying arm and is capable of rotation relative to the bicycle carrying arm along a common longitudinal axis, and wherein the connecting means comprises a plurality of alignable apertures through both the clamp support stud and the bicycle carrying arm which receive a locking pin therethrough.

* * * * *